June 14, 1949.       H. C. KEYSOR       2,473,027
SPRING PRODUCT AND METHOD OF FORMING SAME
Filed May 4, 1945
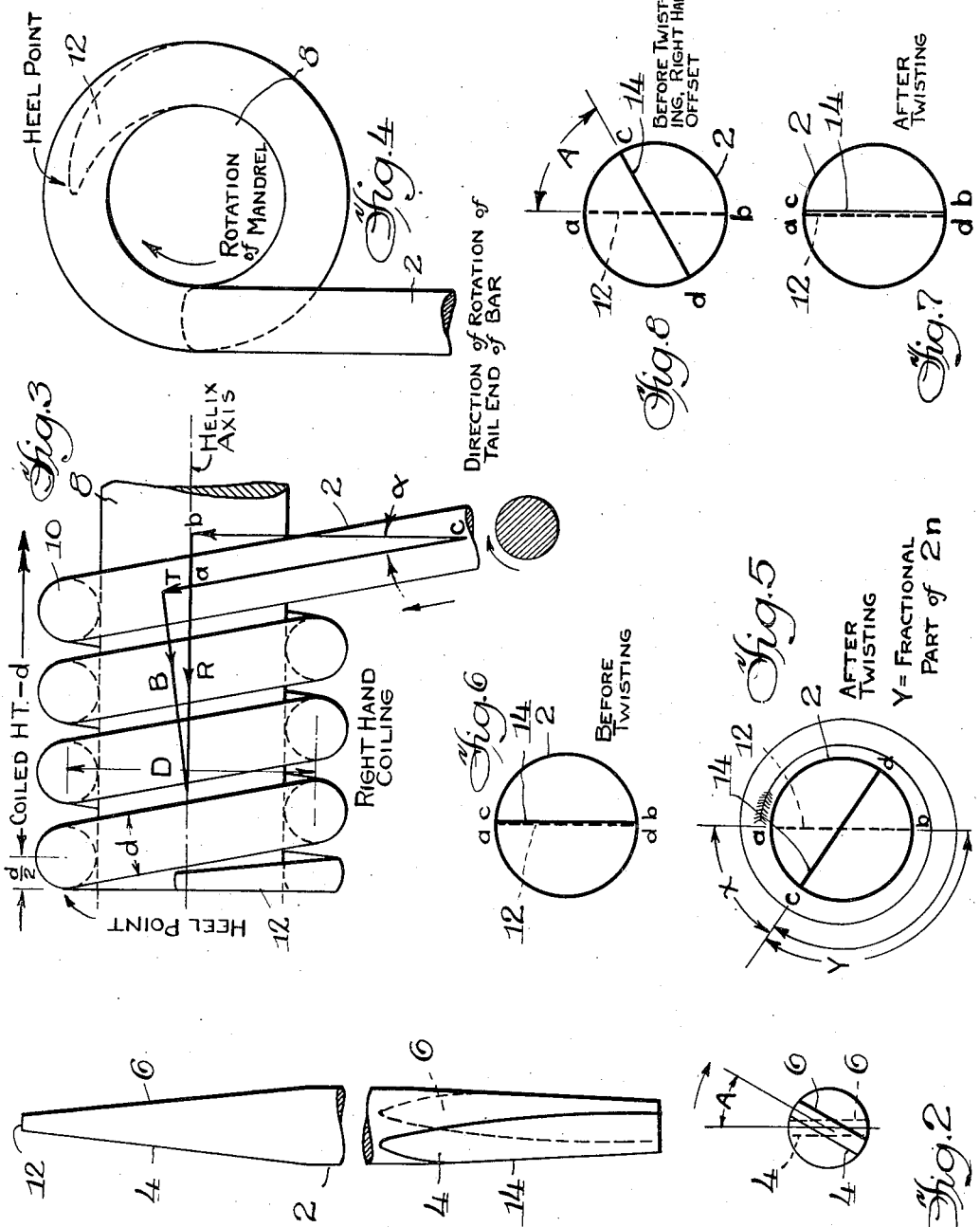
INVENTOR.
Harold C. Keysor
BY
[signature]
Atty.

Patented June 14, 1949

2,473,027

UNITED STATES PATENT OFFICE 2,473,027

SPRING PRODUCT AND METHOD OF FORMING SAME

Harold C. Keysor, Chicago, Ill., assignor to American Steel Foundries, Chicago, Ill., a corporation of New Jersey Application May 4, 1945, Serial No. 591,977

9 Claims. (Cl. 267—61)

My invention relates to a spring product and the method of forming the same.

In the manufacture of helical springs coiled from spring bars of round stock having relatively large diameters, the spring bars are usually formed at each end with plane surfaces converging toward the extremity and a haphazard attempt has heretofore been made by the spring manufacturer to dispose the surfaces at each end of the bar in such angular relationship that when the bars are coiled into helical springs, each coiled spring will have one of the surfaces at each end of the bar forming a bearing surface for the end of the spring and disposed in a plane perpendicular to the helix axis. In the formation of a spring bar of substantial diameter into a helical spring, a process of hot coiling the helical spring on a mandrel is usually employed wherein the first or "dog" end of the bar is clamped to the mandrel with one of the surfaces thereof in a plane perpendicular to the axis of the mandrel to provide a bearing surface for one end of the spring. Inasmuch as the correct angular relationship between the planes of taper of the surfaces at each end of the bar is seldom attained by the bar manufacturer, it is customary practice that the second or "tail" end of the bar is held with a gripping tool by the workman during the coiling operation and the workman twists this end of the bar to bring one of the surfaces thereof into parallel relationship with the bearing surface at the "dog" end of the bar. Considerable difficulty has been experienced in forming a spring in this manner for the "tail" end of the bar continually rotates about the bar axis, necessitating manipulation of the gripping tool by the workman to insure that one of the surfaces of the "tail" end is positioned perpendicular to the helix axis. This is a tedious operation which requires continual manipulation of the gripping tool by the workman and difficulty in twisting the tail end of the bar for the purpose described. Also, considerable skill of the workman is required to approximate parallelism of the bearing surfaces, which are thereafter usually accurately ground to secure parallelism.

It is the principal object of my invention to provide a novel method for making a spring bar of the type described by forming the converging plane surfaces at opposite ends thereof in such an angular relationship that coiling of the bar will produce a helical spring with a bearing surface at each end thereof perpendicular to the helix axis of the spring without manual or other operations.

Another object of my invention is to provide a method for forming a spring bar of the type described for coiling into a helical spring having a plane bearing surface at each end perpendicular to the helix axis without the necessity for accurately grinding the ends and which may be carried out conveniently and quickly and at low expense in manufacturing springs of this type.

Another object of my invention is to provide a method of forming a spring bar to be coiled into a helical spring wherein the angle between the planes of taper of the surfaces at oppostie ends of the bar are properly related to the amount of rotation of the free or "tail" end of the bar about the bar axis so that upon completion of coiling the bar in helical form, one of the tapered surfaces at the tail end of the bar will be in a plane parallel to one of the surfaces at the opposite end of the bar and both surfaces will be in planes perpendicular to the helix axis.

In the drawings:

Figure 1 is a side elevation of the end portions of a spring bar, the intermediate portions being removed to illustrate the relationship of the tapered surface of the respective end portions;

Figure 2 is an end view of the bar shown in Figure 1 looking up from the bottom;

Figure 3 is a diagrammatic view of a spring bar being coiled about a mandrel and Figure 4 is an end view taken from the right as seen in Figure 3;

Figures 5 and 6 are diagrammatic end views respectively of a spring bar coiled in helical form, and the spring bar prior to coiling with the planes of taper of the surfaces in alignment; and Figures 7 and 8 are diagrammatic end views, respectively, of another spring bar coiled in helical form and the spring bar prior to coiling and formed in accordance with my invention.

In Figures 1 and 2 there is shown a spring bar 2 employed in the manufacture of a helical spring having plane parallel bearing surfaces at opposite ends thereof perpendicular to the helix axis of the spring and, for this purpose, the bar 2 is formed at each end with plane surfaces 4 and 6 at opposite sides thereof, the surfaces at each end of the bar converging toward the extremity of the bar and being angularly positioned with respect to the surfaces at the other end of the bar by an angle A as indicated in Figure 2 which shows an end view of the bar looking up from the bottom of the bar.

Referring now to Figure 3 illustrating diagrammatically a spring bar 2 being coiled into a helical spring on a mandrel 8, during the process of hot coiling the spring bar 2 to form a helical spring 10 on the mandrel 8, the first end 12 (called the "dog" end) is clamped to the mandrel in a plane perpendicular to the axis of rotation of the mandrel and, upon rotation of the mandrel, the second or "tail" end 14 (Figure 1) of the bar rotates about the bar axis. If the angle A between the planes of taper of the two ends is properly related to the amount of this rotation, one of the tapered surfaces of the "tail" end will be, upon completion of coiling, in the required plane perpendicular to the axis of rotation of the mandrel and the helix axis of the spring. For this purpose, the relation between the tapers of the two ends may be determined to suit this desired condition.

Referring to Figures 3 and 4 to determine this relationship, rotation can be represented by a vector, and it is customary to take the vector perpendicular to the plane of rotation. Thus the mandrel rotation is represented by vector R in Figure 3. If R is broken up into two components respectively parallel and perpendicular to the bar axis, where the bar starts to contact the mandrel, these components, T and B, represent the relative amount of twisting and bending of the bar. Using the notation:

L=length of bar between heel points;
D=mean coil diameter;
H or HT=free height as coiled;
$n$=number of turns through which tail end twists;
N=number of turns in helix between heel points;
$h$=solid height; and
$d$=bar diameter.

Since the vector triangle is similar to triangle $abc$, it follows from similar triangles:

$$\frac{T}{B} = \frac{ab}{bc}$$

and since $$\cos \alpha = \frac{bc}{ac}$$

$$bc = ac \cos \alpha$$

then:

$$\frac{ab}{bc} = \frac{ab}{ac \cos \alpha}$$

If triangle $abc$ is enlarged to form a similar triangle wherein the side similar to $ac=L$ and the side similar to $ab=H-d$ then:

$$ab:ac \cos \alpha :: H-d : L \cos \alpha$$

which may be expressed:

$$\frac{ab}{ac \cos \alpha} = \frac{H-d}{L \cos \alpha}$$

By definition:

$$\frac{T}{B} = \frac{n}{N}$$

because the length of the vector is taken directly proportional to the angle of rotation it represents. Then:

$$\frac{n}{N} = \frac{H-d}{L \cos \alpha}$$

$$n = \frac{N(H-d)}{L \cos \alpha}$$

and since $$L \cos \alpha = \pi DN$$

$$L = \frac{\pi DN}{\cos \alpha}$$

and $$n = \frac{(H-d)}{\pi D}$$

$$n = \frac{H-d}{\pi D} \quad \text{(Eq. 1)}$$

This last equation gives the total twist of the tail end in turns. It can be seen that the twist $n$ is in direct proportion to the tangent of the helix angle $\alpha$ (Figure 3); if $\alpha=0$, as in a flat strip wound upon itself, the twist is zero, and if $\alpha=90°$ pure twisting is had with no bending.

To dispose one of the surfaces of the tail end in a plane perpendicular to the helix axis, the rotation $n$ must be properly related to the offset angle A. Expressing the twist in half turns:

$$2n = \frac{2(H-d)}{\pi D}$$

Let the fractional part of $2n$ be represented by $$\left[\frac{2(H-d)}{\pi D}\right]_F \quad \text{(Eq. 2)}$$

It may be noted that the expression or function $$\left[\frac{2(H-d)}{\pi D}\right]_F$$

has been arbitrarily chosen to represent the fractional part of the quantity derived by substituting numerical values in the function $$\left[\frac{2(H-d)}{\pi D}\right]$$

as hereinafter more fully explained. This fraction of a half turn therefore is the amount by which the tail twists past the desired position, consequently "tailing in" will be achieved if the tail lags by this same amount. That is, the required offset of end-tapers is equal to:

$$\left[\frac{2(H-d)}{\pi D}\right]_F$$

in amount and opposite in direction (lagging). The same result is secured if the offset leads by the supplement of $$\left[\frac{2(H-d)}{\pi D}\right]_F$$

Obviously, the simplest plan is to use whichever gives the minimum offset. The term offset is illustrated in Figure 2 where it is shown as the angle A between the planes of taper, and it will be considered as right hand in the direction shown in Figure 2, and left hand if in the opposite direction.

The relation between tail twist and offset is illustrated in Figures 5 and 6 in which a bar is viewed from the end, the taper plane of the far end being shown dotted $ab$ and the near end solid $cd$. Referring now to Figures 5-8, inclusive, suppose a bar is formed with the two end-tapers in the same plane and the far or "dog" end 12 (shown dotted in Figures 5 and 6) be held fast, and the near or "tail" end 14 (shown by the solid diametral line) be twisted through $2n$ half turns, the fractional part of $2n$ being greater than one half for this particular purpose. Viewed from the near end 14 it would appear as in Figure 5, and the angle Y would have the magnitude shown in Eq. 2. In other words, the "tail" end 14 would miss finishing in the proper position by angle Y and therefore, if it were made with an initial offset (right hand) of angle $A=Y$ as shown in Figure 8 and twisted through the same $2n$ half turns, it would finish with the ends in alignment, i. e., with one of the surfaces at each end of the coiled bar perpendicular to the helix axis as shown in Figure 7. It may be noted that Figure 5 illustrates a case where $2n$ is composed of an odd integral number plus a fraction. If $2n$ is an even integral number plus a fraction, the only difference will be to interchange points C and D and the formula previously given will still apply.

The following rule can thus be formulated determining the offset angle A:

Right hand coiling:

$$2n = \frac{2(H-d)}{\pi D} \text{ number of half turns in tail twist.}$$

$$\left[\frac{2(H-d)}{\pi D}\right]_F = \text{fractional part of } 2n.$$

If the fractional part of $2n$ is more than $\frac{1}{2}$:

$$A = 1 - \left[\frac{2(H-d)}{\pi D}\right]_F$$

and A is right hand (as in Figure 2). Note that the offset A is in the same direction as the bar twist. If the fractional part of $2n$ is less than $\frac{1}{2}$:

$$A = \left[\frac{2(H-d)}{\pi D}\right]_F$$

and A is left hand (opposite to Figure 2). Note that A is in the opposite direction to the bar twist. For left hand coiling the same rule is followed as above but the final A is reversed. Since A is in half turns, multiply by 180 to convert to degrees.

From the foregoing disclosure, it will be apparent that by the use of my novel method, spring bars may be formed with the desired angularity between the plane surfaces at opposite ends thereof so that coiling of the bars will invariably result in a helical spring having plane parallel bearing surfaces perpendicular to the helix axis by a relatively simple mechanical coiling operation without the necessity of employing a skilled workman to assist in coiling the springs and, thereafter, to accurately grind the ends of the spring bar to secure the aforementioned desirable result.

A few numerical examples are hereafter given to illustrate the computation of the angle A in left and right hand wound helical spring.

Left hand coiling:

H (coiling or free height) = $8\frac{3}{4}''$
d (bar diameter) = $1\frac{7}{32}''$
D (mean coil diameter) = $4\frac{9}{32}''$ Then:

$$\frac{2(H-d)}{\pi D} = \frac{2(8\frac{3}{4} - 1\frac{7}{32})}{\pi \times 4\frac{9}{32}} = 1.120$$

$$\left[\frac{2(H-d)}{\pi d}\right]_F = 0.120$$

A=0.120 half turn. To convert the fractional part of the half turn into degrees multiply by 180° which equals 21.6° or approximately 22° right hand (because spring is coiled left hand).

Right hand coiling:

H=$8\frac{3}{4}''$
d=$\frac{11}{16}''$
D=$2\frac{1}{4}''$ $$\frac{2(8\frac{3}{4} - \frac{11}{16})}{\pi \times 2\frac{1}{4}} = 2.281$$

A=0.281 half turn=50.58° or approximately 51° left hand.

Left hand coiling:

H=$8\frac{3}{4}''$
d=$1\frac{3}{16}''$
D=$4\frac{1}{4}''$ $$\frac{2(8\frac{3}{4} - 1\frac{3}{16})}{\pi \times 4\frac{1}{4}} = 1.133$$

A=0.133 left turn=23.84° or approximately 24° right hand.

Right hand coiling:

H=$8\frac{3}{4}''$
d=$\frac{5}{8}''$
D=$2\frac{1}{4}''$ $$\frac{2(8\frac{3}{4} - \frac{5}{8})}{\pi \times 2\frac{1}{4}} = 2.299$$

A=0.299 half turn=53.82° or approximately 54° left hand.

I claim:

1. The method of forming a spring bar of round stock adapted to be coiled right hand into a helical spring comprising the following steps, cutting to length a bar of spring stock, forming two converging tapering planes at one end thereof and forming two planes of taper at the other end thereof disposed at an angle in degrees with respect to the first-mentioned planes in accordance with the following equation:

$$180° \times \left[\frac{2(H-d)}{\pi D}\right]_F$$

wherein $$\left[\frac{2(H-d)}{\pi D}\right]_F$$

represents the fractional part of the quantity obtained by substituting numerical values for H, d, $\pi$, and D in the function $$\left[\frac{2(H-d)}{\pi D}\right]$$

H being the free height of the helical spring into which the bar is to be coiled, d the bar diameter, and D the mean coil diameter of said spring, whereby said bar upon coiling into a helical spring will have one of the surfaces at each end thereof substantially perpendicular to the helix axis of said spring.

2. The method of forming a spring bar of round stock adapted to be coiled left hand into a helical spring comprising the following steps, cutting to length a bar of spring stock, forming two converging tapering planes at one end thereof and forming two planes of taper at the other end thereof disposed at an angle in degrees with respect to the first-mentioned planes in accordance with the following equation:

$$180° \times \left[\frac{2(H-d)}{\pi D}\right]_F$$

wherein $$\left[\frac{2(H-d)}{\pi D}\right]_F$$

represents the fractional part of the quantity obtained by substituting numerical values for H, d, $\pi$, and D in the function $$\left[\frac{2(H-d)}{\pi D}\right]$$

H being the free height of the helical spring into which the bar is to be coiled, d the bar diameter, and D the mean coil diameter of said spring, whereby said bar upon coiling into a helical spring will have one of the surfaces at each end thereof substantially perpendicular to the helix axis of said spring.

3. The herein described process of manufacturing a spring bar of round stock adapted to be coiled into a helical spring which includes the following steps, cutting to length a bar of spring stock, forming two planes of taper at one end thereof and forming two converging tapering planes at the other end thereof disposed at an angle in degrees with respect to the first-mentioned planes in accordance with the following equation:

$$180° \times \left[\frac{2(H-d)}{\pi D}\right]_F$$

wherein $$\left[\frac{2(H-d)}{\pi D}\right]_F$$

represents the fractional part of the quantity obtained by substituting numerical values for $H$, $d$, $\pi$ and $D$ in the function $$\left[\frac{2(H-d)}{\pi D}\right]$$

$H$ being the free height of the helical spring into which the bar is to be coiled, $d$ the bar diameter and $D$ the mean coil diameter of said spring.

4. The method of forming a helical spring coiled right hand and having a substantially plane bearing at each end thereof perpendicular to the helix axis comprising the steps of providing a spring bar of round stock having each end formed with substantially plane surfaces tapering toward the extremity with an angle in degrees between the planes of taper of the surfaces at opposite ends thereof satisfying the equation:

$$180° \times \left[\frac{2(H-d)}{\pi D}\right]_F$$

wherein $$\left[\frac{2(H-d)}{\pi D}\right]_F$$

represents the fractional part of the quantity obtained by substituting numerical values for $H$, $d$, $\pi$ and $D$ in the function $$\left[\frac{2(H-d)}{\pi D}\right]$$

$H$ being the free height of the helical spring into which the bar is to be coiled, $d$ the bar diameter and $D$ the mean coil diameter of said spring, securing one end of the bar to a mandrel with one of the surfaces of the end in a plane perpendicular to the axis of rotation of the mandrel, and coiling the bar into a right hand helix on the mandrel.

5. The method of forming a helical spring coiled left hand and having a substantially plane bearing at each end thereof perpendicular to the helix axis comprising the steps of providing a spring bar of round stock having each end formed with substantially plane surfaces tapering toward the extremity with the angle in degrees between the planes of taper of the surfaces at opposite ends thereof satisfying the equation:

$$180° \times \left[\frac{2(H-d)}{\pi D}\right]_F$$

wherein $$\left[\frac{2(H-d)}{\pi D}\right]_F$$

represents the fractional part of the quantity obtained by substituting numerical values for $H$, $d$, $\pi$ and $D$, $H$ being the free height of the helical spring into which the bar is to be coiled, $d$ the bar diameter, and $D$ the mean coil diameter of said spring.

6. The method of forming a helical spring coiled and having a substantially plane bearing at each end thereof perpendicular to the helix axis comprising the steps of providing a spring bar of round stock having each end formed with substantially plane surfaces tapering toward the extremity with the angle in degrees between the planes of taper of the surfaces at opposite ends thereof satisfying the equation:

$$180° \times \left[\frac{2(H-d)}{\pi D}\right]_F$$

wherein $$\left[\frac{2(H-d)}{\pi D}\right]_F$$

represents the fractional part of the quantity obtained by substituting numerical values for $H$, $d$, $\pi$ and $D$ in the function $$\left[\frac{2(H-d)}{\pi D}\right]$$

$H$ being the free height of the helical spring into which the bar is to be coiled, $d$ the bar diameter and $D$ the mean coil diameter of said spring.

7. A spring bar of round stock for coiling into a helical spring having a plane surface at each end thereof comprising substantially plane surfaces at each end of said bar tapering toward the extremity with the planes of taper of the surfaces at one end thereof disposed with respect to the planes of taper of the surfaces at the other end thereof at an angle in accordance with the following equation:

$$180° \times \left[\frac{2(H-d)}{\pi D}\right]_F$$

wherein $$\left[\frac{2(H-d)}{\pi D}\right]_F$$

represents the fractional part of the quantity obtained by substituting numerical values for $H$, $d$, $\pi$ and $D$ in the function $$\left[\frac{2(H-d)}{\pi D}\right]$$

$H$ being the free height of the helical spring into which the bar is to be coiled, $d$ the bar diameter and $D$ the mean coil diameter of said spring, whereby said bar upon coiling into a helical spring will have one of the surfaces at each end thereof substantially perpendicular to the helix axis of said spring.

8. A round-section spring bar of substantially uniform cross section throughout its length and adapted to be coiled left-hand into a coil spring, comprising a pair of substantially flat surfaces at each end of the bar converging toward the extremity with the planes of taper of the surfaces at one end of the bar disposed with respect to the planes of taper of the surface at the other end of the bar at an angle in accordance with the following equation:

$$180° \times \left[\frac{2(H-d)}{\pi D}\right]_F$$

wherein $$\left[\frac{2(H-d)}{\pi D}\right]_F$$

represents the fractional part of the quantity obtained by substituting numerical values for H, d, π and D in the function $$\left[\frac{2(H-d)}{\pi D}\right]$$

H being the free height of the helical spring into which the bar is to be coiled, $d$ the bar diameter and D the mean coil diameter of said spring, whereby said bar upon coiling into a helical spring will have one of the surfaces at each end thereof substantially perpendicular to the helix axis of said spring.

9. A round-section spring bar of substantially uniform cross section throughout its length and adapted to be coiled right-hand into a helical spring, comprising a pair of substantially flat surfaces at each end of the bar converging toward the extremity with the planes of taper of the surfaces at one end of the bar disposed with respect to the planes of taper of the surfaces at the other end of the bar at an angle in accordance with the following equation:

$$180° \times \left[\frac{2(H-d)}{\pi D}\right]_F$$

wherein $$\left[\frac{2(H-d)}{\pi D}\right]_F$$

represents the fractional part of the quantity obtained by substituting numerical values for H, d, π and D in the function $$\left[\frac{2(H-d)}{\pi D}\right]$$

H being the free height of the helical spring into which the bar is to be coiled, $d$ the bar diameter and D the mean coil diameter of said spring, whereby said bar upon coiling into a helical spring will have one of the surfaces at each end thereof substantially perpendicular to the helix axis of said spring.

HAROLD C. KEYSOR.

REFERENCES CITED

The following references are of record in the file of this patent:

UNITED STATES PATENTS

| Number | Name | Date |
|---|---|---|
| 809,664 | Bergmann | Jan. 9, 1906 |
| 1,429,690 | O'Connor | Sept. 19, 1922 |
| 1,523,225 | Lukens | Jan. 13, 1925 |
| 1,760,169 | Phelps | May 27, 1930 |
| 1,827,056 | Williams | Oct. 13, 1931 |
| 1,956,336 | Wine | Apr. 24, 1934 |